UNITED STATES PATENT OFFICE.

ALBERT WOLFF, OF HAMBURG, GERMANY.

PRODUCTION OF SULFONIC-ACID SALTS FROM MINERAL-OIL WASTE LIQUORS.

1,240,523.  Specification of Letters Patent.  Patented Sept. 18, 1917.

No Drawing.  Application filed February 28, 1917. Serial No. 151,606

*To all whom it may concern:*

Be it known that I, Dr. ALBERT WOLFF, chemist, a subject of the King of Prussia, residing at Claudiusstrasse 23, Hamburg, Germany, have invented certain new and useful Improvements in the Production of Sulfonic-Acid Salts from Mineral-Oil Waste Liquors, of which the following is a specification.

My invention relates to the treatment of mineral oil waste liquors and more especially to the production of alkali-metal sulfonates therefrom.

As is well known to those conversant with the art of refining mineral oil with the aid of sulfuric acid, after the acid resin has been removed, an acid oil is obtained which is then treated with caustic alkali and alcohol in suitable proportion in order to remove the acid constituents. The waste liquor thus obtained, which will hereinafter be referred to as alcoholic alkaline waste liquor, is then treated with sodium chlorid and a concentrated liquor is obtained which contains on the average 30 per cent. of sulfonates of sodium, 30 per cent. of mineral oil and varying quantities of salt and free alkali.

No method has been found, however, for making pure sulfonates of sodium on a commercial scale, although owing to the valuable properties of the said product such a method would present the greatest interest. The first step in the production of pure sulfonates of sodium is the removal of the mineral oil and the undesirable salts. According to prior methods the oil may be removed by adding alcohol, and in order to get rid of the salts repeated washing with dilute sulfuric acid of about 50 per cent. has proved effective. In this way sulfonic acids free of mineral oil and of salts, such as sodium sulfate, are obtained, said acids containing about 5 per cent. of sulfuric acids. The sulfonic acids thus obtained are useful in splitting up fats, the quantity of sulfuric acid to be added for this purpose being far greater than the quantity admixed with the sulfonic acid in the refining process mentioned above. However in neutralizing the mixture of sulfonic and sulfuric acid with alkali no pure sulfonate of sodium can be obtained, but only a mixture of sodium sulfonates and of sodium sulfates. On the other hand the mass will get greasy to a high degree. For these reasons the normal method described is unfit for practical use and the following method was adopted instead:

The sulfonic acid containing a certain percentage of sulfuric acid is dissolved in alcohol and digested with sodium carbonate free of water until a neutral reaction is attained. It is rather astonishing to find that complete neutralization ensues although the sodium carbonate is not employed in a dissolved state. The sodium sulfate is precipitated as an insoluble deposit which is the more astonishing as sodium carbonate free of water is absolutely insoluble in alcohol and it would therefore seem quite impossible to obtain complete neutralization in this way.

After neutralization with alkali-metal carbonate has been effected the precipitate is allowed to settle and after filtration, if necessary, the spirit is removed by distillation. By this method the alkali-metal salts of sulfonic acids derived from petroleum are obtained in a pure state and with neutral reaction. They are easily soluble in water and can be employed with advantage in the treatment of textile goods and leather.

Contrary to the method of removing the oil before the free sulfonic acid is produced, I prefer removing it afterward. I further prefer repeatedly washing the sulfonic acid obtained beforehand with dilute sulfuric acid in order to remove the salts, such as sodium sulfate, and to prevent crystalline deposits from being formed upon the addition of alcohol, such deposits tending to render the formation of different layers difficult.

In practising my invention I may for instance proceed as follows:

100 kgs. of the alcoholic alkaline waste liquor obtainable in the refining of mineral oil, said liquor containing about 6 to 7 per cent. of alcohol, is intimately mixed by agitation with 25 kgs. of sulfuric acid (50 per cent.), the mixture being heated all the while to 50 to 60 degr. C. After having allowed the whole to settle completely, the sulfonic acid formed is treated two or three times more in the same way with sulfuric acid of 50 per cent. In this way the alcohol present in the liquor is washed out also. In the case where it should prove worth while to recover the alcohol, it may be obtained by distillation before the sulfuric acid treatment. After washing with sulfuric acid the quantity of alcohol of 95 per cent. required for removing the oil (on the average from 100 to 150 per cent. of alcohol) is added. According to the quantity of sulfonic acid present and to the specific weight of the mineral oil as well as to the quantity of alcohol employed the mineral oil will separate either as the upper or as the lower layer. After having removed the oil the alcoholic solution of sulfonic acid is well mixed and agitated with sodium carbonate free of water until it is no longer able to turn congo paper blue. The carbonate in excess and the sodium sulfate formed are allowed to settle, the liquid is then separated from them by decantation and filtration, if necessary, and is evaporated, the sulfonates of sodium being obtained as a mass which is liquid, while hot, and solidifies in the cold.

I claim:—

1. The method of separating sulfuric acid from a sulfonic acid with which it is mixed, which comprises dissolving the mixture in alcohol, adding to the solution substantially dry alkali-metal carbonate to precipitate the sulfuric acid as sulfate, and removing the precipitate.

2. The method which consists in removing from the alcoholic alkaline waste liquor obtainable in refining mineral oil, the oil and salts ordinarily contained therein, dissolving the impure sulfonic acid obtained in alcohol, neutralizing the solution with alkali-metal carbonate free from water, removing the resulting precipitate, and evaporating the alcohol from the sulfonate solution obtained.

3. The method which consists in treating the alcoholic alkaline waste liquor obtainable in refining mineral oil with dilute sulfuric acid to remove the oil and salts, dissolving the impure sulfonic acid obtained in alcohol, neutralizing the solution with alkali-metal carbonate free of water and evaporating the alcohol from the sulfonate solution obtained.

4. The method which consists in decomposing the alcoholic alkaline waste liquor obtainable in refining mineral oil by aid of dilute sulfuric acid, repeatedly washing the sulfonic acid obtained with dilute sulfuric acid to remove the salt, dissolving the impure sulfonic acid obtained in alcohol, neutralizing the solution with alkali-metal carbonate free of water and evaporating the alcohol from the sulfonate solution obtained.

5. The method which consists in heating and agitating the alcoholic alkaline waste liquor obtainable in refining mineral oil with dilute sulfuric acid, repeatedly washing the sulfonic acid obtained with dilute sulfuric acid, adding the quantity of alcohol required for dissolving the oil still present, separating the layers thus formed, neutralizing the sulfonic acid solution with sodium carbonate free of water, removing the deposit and evaporating the liquid.

In testimony whereof I affix my signature in presence of two witnesses.

Dr. ALBERT WOLFF.

Witnesses:
  FRANCIS R. STEWART,
  M. BRINKMAN.